United States Patent [19]
Stirk et al.

[11] Patent Number: 5,408,627
[45] Date of Patent: Apr. 18, 1995

[54] CONFIGURABLE MULTIPORT MEMORY INTERFACE

[75] Inventors: Gary L. Stirk, Grasonville; John M. Jamieson, Severna Park, both of Md.

[73] Assignee: Building Technology Associates, Wilmington, Del.

[21] Appl. No.: 559,968

[22] Filed: Jul. 30, 1990

[51] Int. Cl.⁶ ............................................. G06F 13/18
[52] U.S. Cl. .................................. 395/425; 395/275; 364/967.4
[58] Field of Search .................. 395/425; 365/230.05, 365/189.03; 364/DIG. 1, 242.4, 242.8, 242.91, 244.8

[56] References Cited

U.S. PATENT DOCUMENTS

| | | | |
|---|---|---|---|
| 3,921,145 | 11/1975 | Emm et al. | 395/725 |
| 4,096,572 | 6/1978 | Namimoto | 395/425 |
| 4,253,148 | 2/1982 | Johnson | 364/200 |
| 4,376,973 | 3/1983 | Chivers | 364/200 |
| 4,422,142 | 12/1983 | Inaba et al. | 395/325 |
| 4,443,846 | 4/1984 | Adcock | 395/325 |
| 4,591,982 | 5/1986 | Buonomo et al. | 364/200 |
| 4,648,035 | 3/1987 | Fava et al. | 364/200 |
| 4,893,279 | 1/1990 | Rahman et al. | 365/230.03 |
| 4,953,081 | 8/1990 | Feal et al. | 364/DIG. 1 |
| 4,999,768 | 3/1991 | Hirokawa | 364/200 |
| 5,047,921 | 9/1991 | Kinter et al. | 364/200 |

*Primary Examiner*—Reba I. Elmore
*Assistant Examiner*—B. Peikari
*Attorney, Agent, or Firm*—Cushman Darby & Cushman

[57] ABSTRACT

The present invention uses a logic control to determine which of a plurality of processors receives priority, and generates WAIT signals for the non-selected processor. Further, user configurable pins exist that allow the user to determine the priority that the attached processor will obtain when simultaneous chip selects are transmitted.

31 Claims, 5 Drawing Sheets

| M PRIORITY (LINE 92) | S PRIORITY (LINE 94) | ACCESS SEQUENCE |
|:---:|:---:|:---:|
| 0 | 0 | CAB |
| 0 | 1 | CBA |
| 1 | 0 | ACB |
| 1 | 1 | BCA |

5,408,627

CONFIGURABLE MULTIPORT MEMORY INTERFACE

BACKGROUND OF THE INVENTION

1. Field of Invention

The present invention relates to an interface for a memory array, and more specifically to an asynchronously operating configurable memory interface for a static random access memory (RAM).

2. Description of the Prior Art

Static random access memories, because they do not need to be periodically refreshed, in contrast to dynamic random access memories, can be operated asynchronously, which can increase their speed.

Furthermore, dual ported static RAMS are known, which allow more than one microprocessor to simultaneously access the same memory. However, these dual ported static RAMS are very expensive.

Given these considerations, it is known to try and use a less costly interface that is attached between two processors and the static RAM to closely simulate simultaneous access of the static RAM. However, these known interfaces also have disadvantages. One of these disadvantages include the use of a common buss between the processors and the interface, which slows down the processors. The lack of configurability when prioritizing which processor should gain access to the static RAM when more than processor simultaneously attempts to access the static RAM for a memory operation is another problem, as well as the lack of configurability with respect to word and data widths.

As such, a new type of configurable interface is needed.

SUMMARY OF THE INVENTION

It is an object of the present invention to provide an asynchronously operating configurable interface for a single ported static RAM.

It is another object of the present invention to provide a low cost multiported memory controller for multiport processing environments.

In order to attain the above recited objects of the invention, among others, the present invention uses a logic control to determine which of a plurality of processors receives priority, and generates WAIT signals for the non selected processor. Further, user configurable pins exist that allow the user to determine the priority that the attached processor will obtain when simultaneous chip selects are transmitted.

BRIEF DESCRIPTION OF THE DRAWINGS

These and other advantages of the present invention may be appreciated from studying the following detailed description of the preferred embodiment together with the drawings in which.

DETAILED DESCRIPTION OF THE PREFERRED EMBODIMENT

Figure 1:
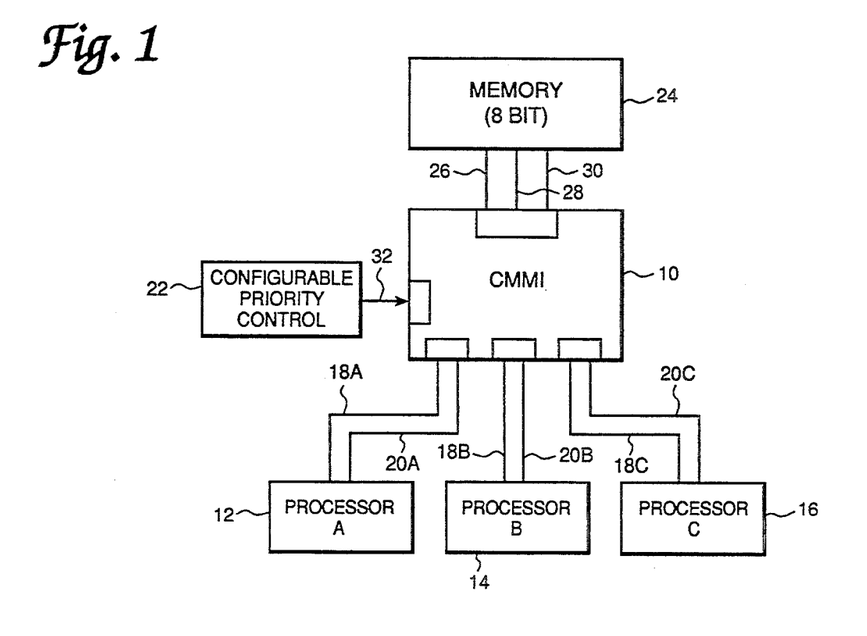
FIG. 1 illustrates a single multiport memory interface in an 8 bit application according to the present invention.

FIG. 1 is a block diagram showing the use of a configurable multiport memory interface (CMMI) 10, according to the present invention, attached to three processors A, B, and C, labelled with the numerals 12, 14, and 16, respectively. CMMI 10 functions to determine which of processors A, B, or C can read or write to a single ported memory 24. Processors A,B, and C, can be, for example Intel 80188, 8088, 80186, or 8086 microprocessors. Using CMMI 10 permits memory 24 to be a low cost single ported static random access memory. Full advantage can be made of the asynchronous operation characteristics of CMMI 10 and at the same time have the cost benefit of using single ported static RAMS. The memory 24 for the embodiment illustrated in FIG. 1 is, at most, memory having an address. Separate address/data lines 18 A-C and control lines 20A-C connect each of processors 12, 14, and 16 to CMMI 10. The use of separate address/data lines and control lines allows each of the connected processor to perform other operations while a different processor is performing a read or write operation with CMMI 10. Data lines 26, address lines 28, and control lines 30 connect memory 24 to CMMI 10.

Also attached to CMMI 10 via control lines 32 is a configurable priority control 22, which allows the user to program which of processors A, B, or C will receive priority to read or write to memory 24 when simultaneous requests from different processors are received as well as performing other control operations.

Once CMMI 10 determines which processor will receive priority, the selected processor can transmit the required data, address, and control information to memory 24 through CMMI 10, as will be described in greater detail hereinafter.

Figure 2:
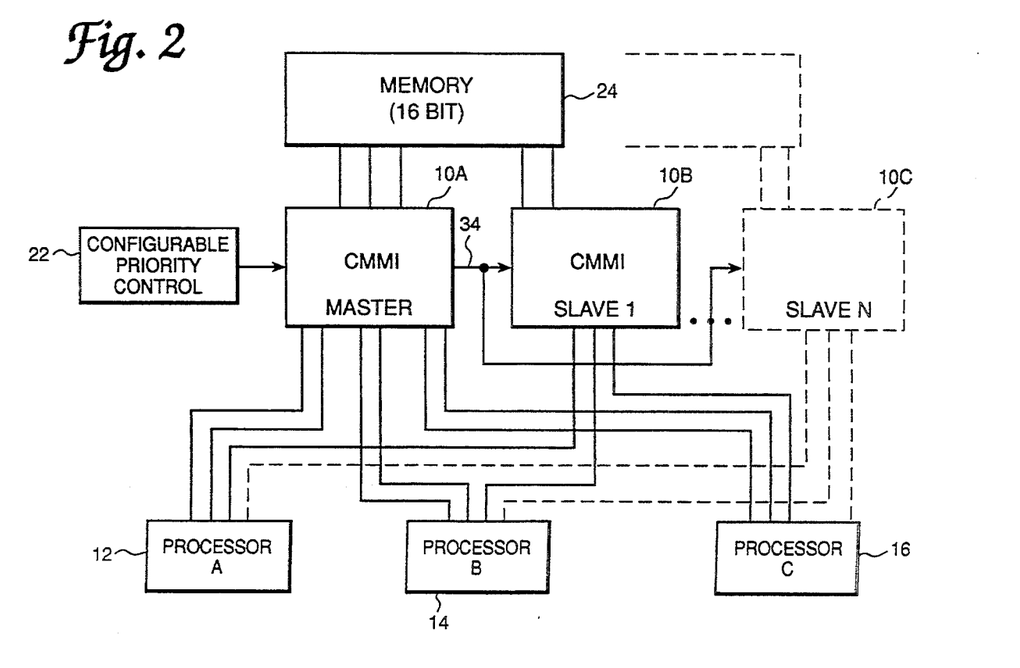
FIG. 2 illustrates a two multiport memory interfaces in 16 bit word width application according to the present invention.

FIG. 2 is a block diagram showing how CMMI 10 can be used for word widths of greater lengths, such as 24, 32, 64 or larger numbers of bits. When used for larger word widths, several CMMI 10's are arranged in parallel, one CMMI 10, labelled CMMI 10A in FIG. 2, performs the logical operations, and outputs the results of these logical operations to CMMI 10B, 10C, or however many are connected via slave control lines 34. CMMI 10B, 10C etc. only require connection to the appropriate bits of address/data lines 18 connected to processors A, B, and C and the appropriate bits of data lines 26 and address lines 28 that will result from the larger memory size.

Figure 3A:
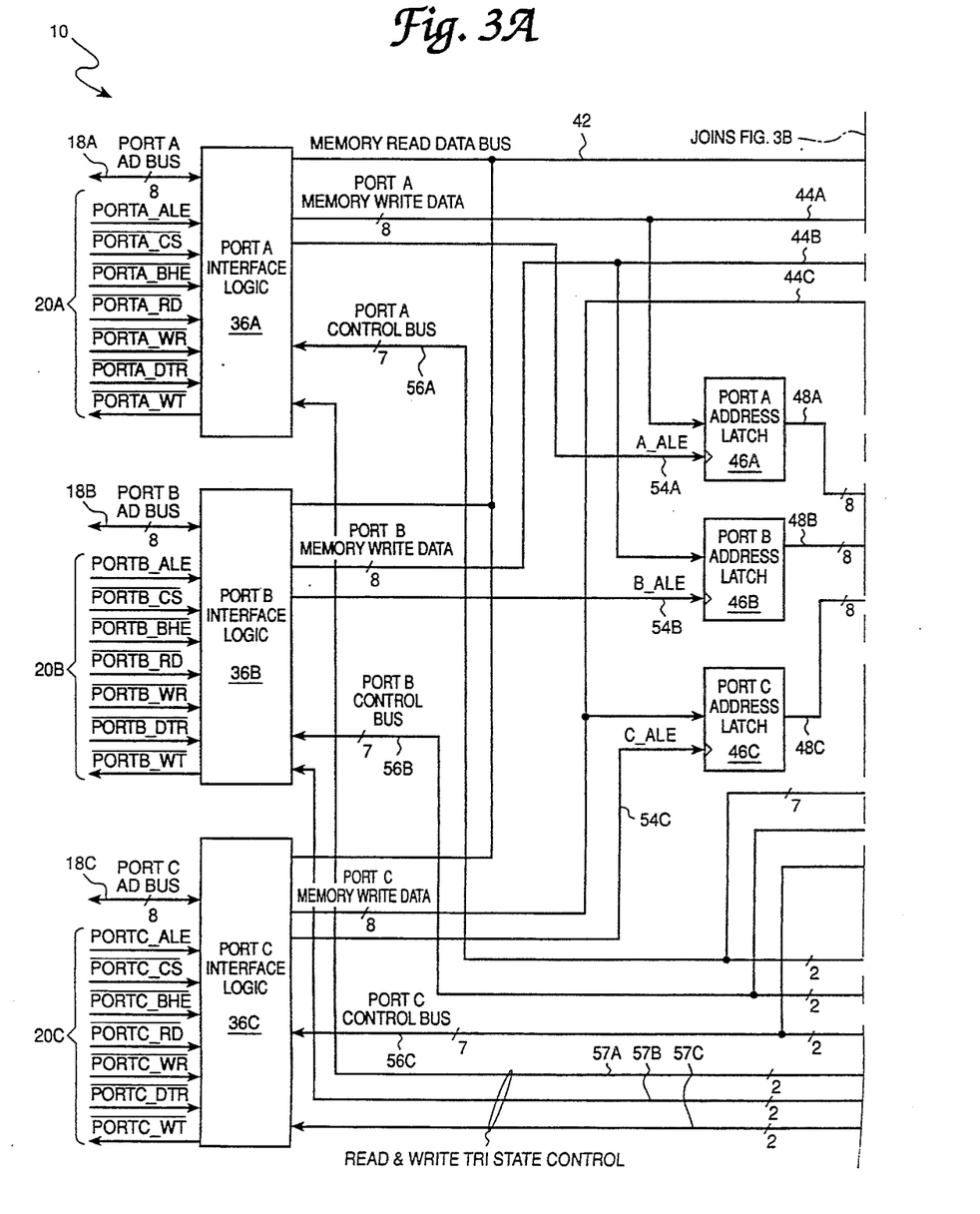
FIGS. 3A and 3B together illustrate a detailed block diagram of the multiport memory interface according to the present invention.
Figure 3B:
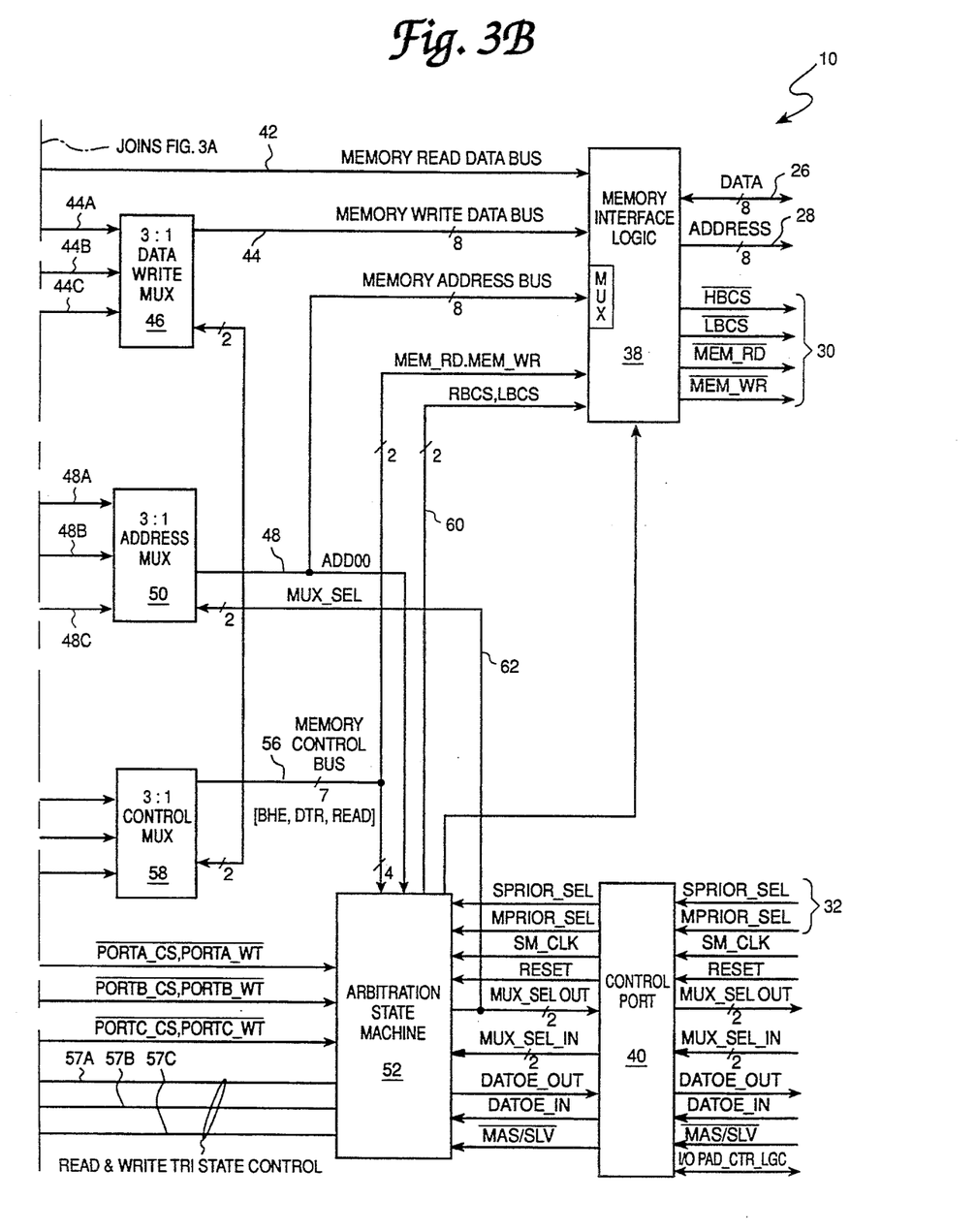

FIGS. 3A and 3B, referred to also as FIG. 3, collectively, together provide a schematic/block diagram showing CMMI 10 in greater detail. Processor interfaces 36A-C each allow connection to processors A, B, and C, respectively, while memory interface 38 and control interface 40 connects to the attached memory storage device. An 8 bit memory read data bus 42 is connected between each of processor interfaces 36A-C and memory interface 38, while 8 bit memory write data busses 44A-C are connected to data write multiplexer 46, which outputs write data to memory interface 38 through 8 bit memory write data bus 44.

Memory write data busses 44 A–C each also are connected to address latches 46A–C, respectively. 8-bit address busses 48 A–C each connect at one end the respective address latch 46A–C. The latched address is connected to address multiplexer 50. Address bus 48 then connects to address multiplexer 50 and memory interface 38. Address 00 of address bus 48 also connects to arbitration state machine 52, described in greater detail hereinafter. Each address latch 46A–C is connected to the respective ADDRESS ENABLE control line from each of processor interfaces 36A–C via address control lines 54A–C, respectively.

Also illustrated in FIG. 3 are memory control busses 56A–C, which transmit BUSS HIGH ENABLE, READ, WRITE, DTR, and LOCK signals from each of control lines 20A–C to control multiplexer 58. Memory control bus 56, connected at the output of control multiplexer 58, is connected to memory interface 38 to transmit the selected READ or WRITE signals and is connected to arbitration state machine 52 to transmit the selected BUSS HIGH ENABLE, DTR, and LOCK signals. Memory control busses 56A–C are also directly connected to arbitration state machine (ASM) 52 to directly transmit the CHIP SELECT signals and also transmit WAIT signals from ASM 52 to 36A–C.

ASM 52 inputs PRIORITY SELECT A and PRIORITY SELECT B, as well as an external CLOCK and RESET signals, These control signals are used in the mode of operation of CMMI 10 illustrated in FIG. 1. The other signals input and output from ASM 52 are used when a plurality of CMMI 10's are used for larger data widths and depths, and will be described later. However, it should be noted that in this mode of operation that the MASTER/SLAVE signal is held low, which indicates to the ASM 52 that it will perform the logic operations, i.e., the master mode.

Also illustrated in FIG. 3 are processor interface control lines 57A–C, which control each of the processor interfaces 36A–C, respectively. Chip select control lines 60 is connected between ASM 52 and memory interface 38 to transmit HBCS and LBCS signals to memory 24. Further, multiplexer control line 62 is connected between ASM and data write multiplexer 46, address multiplexer 50, and control multiplexer 58.

Figure 4:
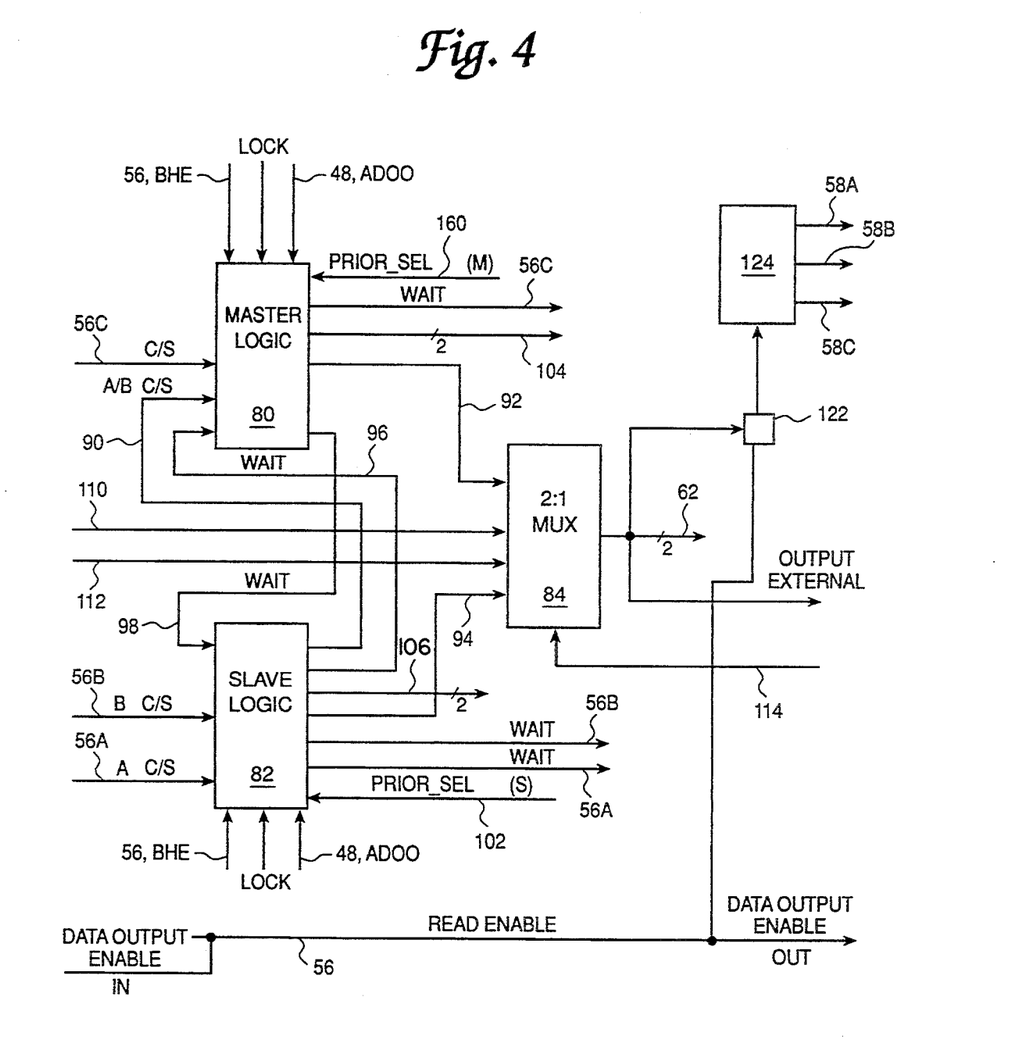
FIG. 4 illustrates an detailed block diagram of the arbitration circuit of the multiport memory interface according to the present invention.

FIG. 4 illustrates, in block form, the preferred embodiment of ASM 52. As illustrated, the arbitration decision is implemented using a master decision block 80 and a slave decision block 82.

Master decision block 80 inputs the CHIP SELECT C along bus 56C, PRIORITY SELECT A from line 100, which is either held low internally or set high externally. Also input is line 90 from slave decision block 82, the BHE and ad00 lines from the selected processor, which are input along bus lines 48 and 56. Decision block 80 outputs a SELECT 0 signal along line 92, a two bit high or low byte chip select along line 104.

Slave decision block 82 inputs the CHIP SELECTS A and B from busses 56A and 56B, PRIORITY SELECT B from line 102, which is either held low internally or set high externally. Also input are the BHE and ad00 lines from the selected processor, which are input along bus lines 48 and 56, Decision block 82 outputs a SELECT 1 signal along line 94 and a two bit high or low byte chip select along line 106.

Each decision block decides which of two processors should receive priority, given it inputs. The line 90 output into block 80 is the ORed logic result, which is a combination of the CHIP SELECTS A and B. Each decision block 80 and 82 will output an output SELECT bit. The SELECT 0 and 1 bits are output through multiplexer 84 if in a master mode, and then used as the select inputs along lines 62 to determine which of PROCESSORS A, B, or C data, address, and control information will pass through multiplexers 46, 50, and 58.

If processor C is chosen, it generates a WAIT signal along line 98 to decision block 82, which then sends a WAIT along both lines 56A and 56B. If Processor A or B is chosen, a WAIT signal is generated along line 96 and the WAIT is output to Processor C via bus 56C.

Figure 5:
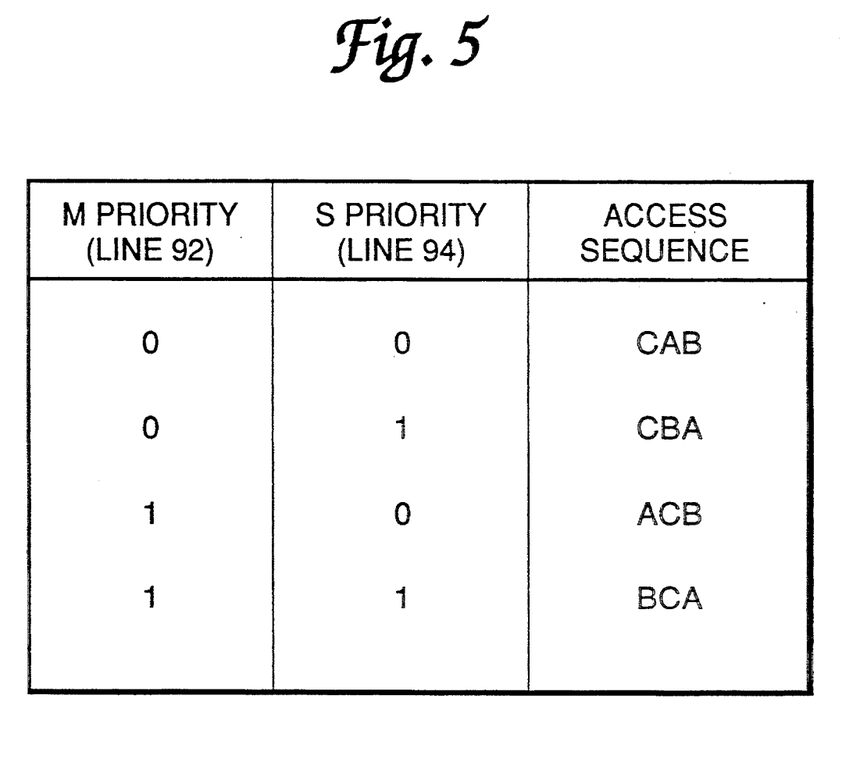
FIG. 5 illustrates a processor priority table of the multiport memory interface according to the present invention.

FIG. 5 illustrates a processor priority table of the multiport memory interface according to the present invention.

Many different conditions between processor states exist. Therefore, for clarity, Appendix A is attached and set forth the HDL code for the various states and respective logic equations. Each of decision blocks 80 and 82 use these same logic equations in determining which of the two CHIP SELECT inputs receives priority.

Also for the processor chosen, the present invention includes the ability to select whether the byte to be input is a high byte or low byte, as known in the art. For the selected processor either the high or low byte chip select signals will be output along either lines 104 or 106, and are determined using BHE and AD00 for the selected processor, as further described by the equations, previously referenced, in appendix A.

Also, the output of multiplexer 84 is used to configure the tri state buffers within interfaces 36A,B and C. Using this output as a select line, only when a READ ENABLE is asserted, as indicated by the switch 122, which then selects the output to drive the appropriate tri state buffers from driver/mux 124.

It should be clear that depending on the priority configuration of lines 100 and 102 and the speed considerations necessary that the present invention is most suited for having Processor C be the processor attached needing the highest priority to the data stored in the attached memory.

Lines 62 can be output off the circuit, as shown in FIG. 3 and used as inputs when a chip is operating in a slave mode. In a slave mode, mux select line 114 will be switched to use the logic determination on line 62 of the master CMMI, which is then input along lines 110 and 112, such that the logic within decision blocks 80 and 82 is not used when operating in a slave mode. The DATA OUTPUT ENABLE for all memories connected to a CMMI10A is controlled by the master CMMI 10. As such, an data output enable output line 120 for a CMMI 10 used as a master, such as in FIG. 1, as well as a data output enable input line for when CMMI is operating as a slave CMMI 10B or 10C as shown in FIG. 2

. It should be noted that CMMI 10 uses signals generated by processors A, B, and C, and does not internally generate any read or write signals.

For a read operation, the selected processor, for example processor A, first transmits a READ signal, which passes through control multiplexer 58 to memory interface 38 and onto memory 24. Processor A then transmits the memory cell address along address/data lines 18A, which passes through processor interface 36A to latch 46A. During this time, the ADDRESS LATCH ENABLE from processor A is on and the address data is transmitted to address multiplexer 50, and transmitted through address multiplexer 50. The address data is then transmitted through memory interface 38 to memory 24. ASM 52 then generates a DATA READ ENABLE, which is used by CMMI 10 to control the direction of the tri-state buffers within processor interface 36A, as is known in the art. The memory data is transmitted to memory read data buss 42, and is then transmitted along address/data lines 18A to processor A via processor interface 36A, after which time the DATA READ ENABLE is dropped.

For a write operation, a processor, such as processor A, transmits a WRITE signal, which passes through control multiplexer 58 to memory interface 38 and onto memory 24. The correct address is latched into address latch 46A through write data line 44A, during which time the ADDRESS LATCH ENABLE from processor A is on and the address data is transmitted to address multiplexer 50, and through address multiplexer 50 due to the MUX SELECT A signal. The ADDRESS LATCH ENABLE is then dropped, and write data line 44A is used to transmit the data to be written to data write multiplexer 46. Prior to the writing of the data onto data multiplexer 46, a DATA WRITE ENABLE is generated by ASM 52 to prepare write data buss 44A for writing information to data multiplexer 46, and then onto memory 24 through memory interface 38. After the writing operation is complete, the DATA WRITE ENABLE is then dropped.

The above described operation will effect transfers of addresses and data up to 8-bits wide. However, for addresses and data of greater widths, the configuration of CMMI 10 illustrated in FIG. 2 is necessary. When using this configuration, the MUX SELECT, DATA READ ENABLE, and DATA WRITE ENABLE signals are output from ASM 52, through control port 40, and into the respective inputs on the control port 40 of the at least one attached CMMI 10A.

To configure CMMI 10A to operate as a "slave" part, the MASTER/SLAVE signal of line 114 is turned high. Effectively, this then disables most of ASM 52 in the slave CMMI 10A and only uses the few logical operations that use the MUX SELECT, DATA READ ENABLE, and DATA WRITE ENABLE signals to keep the address busses 54 and 54A–C, memory write data busses 44 and 44A–C, and memory read data bus 42 at their proper potentials, at the appropriate times in the cycle, so that proper writing of address and data, as well as reading of data, can take place.

It should also be noted that the DTR signal that exists in many processors and can advantageously be used to speed operation of the CMMI 10 to be able to "look ahead". Also, the LOCK function built into many existing can be microprocessors can be advantageously utilized by CMMI 10, and its use to perform the equivalent of a read modify write is included within the logic of Appendix A. While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

APPENDIX A

```
State: ST00
    Equations:
        : PROCB_WT    = (PROCA_CS & PROCB_CS & !PRIOR_SEL)
                      # (PROCB_CS & WAIT
        : PROCA_WT    = (PROCA_Cs & PROCB_CS & PRIOR_SEL)
                      # (PROCA_CS & WAIT )
    Transitions:           Type: dependent
        Case:      (!PROCA_CS & !PROCB_CS) # WAIT
                   Goto: ST00
        Case:      PROCA_CS & !PROCB_CS
                   Goto: ST01
        Case:      !PROCA_CS & PROCB_CS
                   Goto: ST04
        Case:      PROCA_CS & PROCB_CS & !PRIOR_SEL
                   Goto: ST01
        Case:      PROCA_CS & PROCB_CS & PRIOR_SEL
                   Goto: ST04
State: ST01
    Equations:
        : LBCS = PROCA_CS & !ADD00
        : HBCS = PROCA_CS & BHE
        : PROCA_SEL = 1
        : PROCB_WT    = (PROCA_CS & PROCB_CS) # (LOCK & PROCB_CS)
                      # (PROCB_CS & WAIT)
    Transitions:           Type: dependent
        Case: default
                   Goto: ST02
State: ST02
    Equations:
        : LBCS = PROCA_CS & !ADD00
        : HBCS = PROCA_CS & BHE
        : PROCA_SEL = 1
        : PROCB_WT    = (PROCA_CS & PROCB_CS) # (LOCK & PROCB_CS)
                      # (PROCB_CS & WAIT)
    Transitions:           Type: dependent
        Case:      PROCA_CS # LOCK # WAIT
                   Goto: ST02
        Case:      !PROCA_CS & !PROCB_CS
                   Goto: ST00
        Case:      !PROCA_CS & PROCB_CS
                   Goto: ST03
State: ST03
    Equations:
        : PROCA_WT    = (PROCB_CS & PROCA_CS) # (LOCK & PROCA_CS)
```

APPENDIX A-continued

```
                     # PROCA_CS & WAIT)
   Transitions:           Type: dependent
     Case: default
              Goto: ST04
State: ST04
   Equations:
     : LBCS = PROCB_CS & !ADD00
     : HBCS = PROCB_CS & BHE
     : PROCB_SEL = 1
     : PROCA_WT   = (PROCB_CS & PROCA_CS) # (LOCK & PROCA_CS)
                     # (PROCA_CS & WAIT)
   Transitions:           Type: dependent
     Case: default
              Goto: ST05
State: ST05
   Equations:
     : LBCS = PROCB_CS & !ADD00
     : HBCS = PROCB_CS & BHE
     : PROCB_SEL = 1
     : PROCA_WT   = (PROCB_CS & PROCA_CS) # (LOCK & PROCA_CS)
                     # (PROCA_CS & WAIT)
   Transitions:           Type: dependent
     Case:     PROCB_CS # LOCK
              Goto: ST05
     Case:     !PROCB_CS & PROCA_CS
              Goto: ST01
     Case:     (!PROCA_CS & !PROCB_CS) # (!PROCB_CS & PROCA_CS & WAIT)
              Goto: ST00
```

We claim:

1. An apparatus for controlling access to a single port memory having only one data port connected to memory data lines and only one control port connected to memory control lines by first, second, and third processors that are connected respectively to first, second and third data and control lines and that generate at least first, second and third chip select control signals, address signals and control signals, respectively, and initiate memory operations for transmission of write data to and read data from said memory comprising:

memory input/output means, connectable to said memory data data to and read data from said memory, respectively, and transmitting said address and control signals to said memory;

first input/output means, connectable to said first data and control lines, for receiving said first chip select signal, said first address signals and said first write data from said first processor and transmitting said first read data to said first processor;

second input/output means connectable to said second data and control lines, for receiving said second chip select signal, said second address signals and said second write data from said second processor and transmitting said second read data to said second processor;

third input/output means, connectable to said third data and control lines, for receiving said third chip select signal, said second address signals and said second write data from said third processor and transmitting said third read data to said third processor;

means for determining which one of said first, second, and third processors will be granted access to said memory to perform said memory operation, said determining means comprising:

means for prioritizing said first, second, and third processors to give a first grant access of said memory to one of said first, second and third processors when said first, second and third chip select signals are input to said prioritizing means at substantially the same time, said prioritizing means capable of being repeatedly altered to change said first grant prioritization when said substantially simultaneous first, second, and third chip select signals are input, and means, responsive to said prioritizing means, for transmitting data associated with said one processor between said one processor and said memory during said memory operation prior to transmitting subsequent data between any processor other than said one processor and said memory.

2. An apparatus according to claim 1 wherein said memory input/output means, said first input/output means, said second input/output means, and said third input/output means each include a data port connectable to said respective data lines and a control port connectable to said respective control lines.

3. An apparatus according to claim 1 wherein said prioritizing means includes first and second priority input lines on which first and second priority input signals are transmitted to provide for changing said first grant prioritization, said second priority input signal, when input at a predetermined state, causing said prioritizing means to always provide said first grant access to said third processor when said first, second, and third chip select signals are input at substantially the same time.

4. An apparatus according to claim 2 wherein said prioritizing means comprises:

slave decision means for comparing said first and second chip select signals to obtain a slave chip select signal and a first select signal, and master decision means for comparing said third chip select signal with said slave chip select signals to obtain a second select signal, said first and second select signals indicating which of said first, second and third processors receives priority.

5. An apparatus according to claim 4 in which a first priority input line is connected to said slave decision means and a second priority input line is connected to said master decision means to provide for transmission of first and second priority input signals, respectively, to alter said first grant prioritization, said second priority input signal, when input at a predetermined state, causing said prioritizing means to always provide said first grant access to said third processor when said first, second, and third chip select signals are input at substantially-the same time.

6. An apparatus according to claim 5 wherein said slave decision means further comprises means for generating first and second wait signals and said master decision means further comprises means for generating a third wait signal, said wait signals generated associated with said processors other than said one processor and wherein said first, second and third wait signals, when generated, are transmitted to said first, second and third input/output means, respectively, for subsequent use by said first, second and third processors, respectively.

7. An apparatus according to claim 1 further including means for configuring said prioritizing means to perform in one of a master mode and a slave mode.

8. An apparatus according to claim 7 wherein said configuring means includes a multiplexer.

9. An apparatus for controlling access to a single port memory having only one data port connected to memory data lines and only one control port connected to memory control lines, by at least first and second processors, connected respectively to first and second data and control lines that generate at least first and second chip select control signals, address signals and control signals, respectively, and initiate memory operations for transmission of write data to and read data from said memory comprising:
 memory input/output means connectable to said memory data lines and said memory control lines, for transmitting said write data to and read data from said memory;
 first input/output means, connectable to said first data and control lines, for receiving said first chip select signal, said first address signals and said first write data from said first processor and transmitting said first read data to said first processor;
 second input/output means connectable to said second data and control lines, for receiving said second chip select signal, said second address Signals and said second write data from said second processor and transmitting said second read data to said second processor; and
 means for determining which one of said first and second processors will be granted access to said memory to perform said memory operation, said determining means comprising:
  means for prioritizing said first and second processors to give a first grant to access said memory to one of said first and second processors when said first and second chip select signals are input to said prioritizing means at substantially the same time, said prioritizing means capable of being repeatedly altered to change said first grant prioritization when said substantially simultaneous first and second chip select signals are input, and
  means, responsive to said prioritizing means, for transmitting data associated with said one processor between said one processor and said memory during said memory operation prior to transmitting subsequent data between any processor other than said one processor and said memory.

10. An apparatus according to claim 9 wherein said determining means further comprises means for generating a wait signals for the processor other than said one selected processor when said first and second processors input said first and second chip select signals at substantially the same time.

11. An apparatus according to claim 9 further including means for configuring said prioritizing means to perform in one of a master mode and a slave mode.

12. An apparatus according to claim 11 wherein said configuring means includes a multiplexer.

13. An apparatus according to claim 3 wherein, said first priority input signal, when input at a predetermined state, causing said prioritizing means to always provide said first grant access to said second processor when said first and second chip select signals are input at substantially the same time.

14. An apparatus according to claim 5 wherein, said first priority input signal, when input at a predetermined state, causing said prioritizing means to always provide said first grant access to said second processor when said first and second chip select signals are input at substantially the same time.

15. An apparatus according to claim 2 wherein;
 said data port of each of said first, second and third input/output means including a data read input and a data write output; and
 wherein said determining means further comprises:
  a data read transmission line electrically connecting each of said first, second and third read data inputs to said input/output means data port;
  a data write multiplexer having first second and third write data inputs connected respectively to said data write output of said first, second and third input/output means, and a data write output connected to said input/output means data port;
  an address multiplexer having first second and third data inputs connected respectively to said address ports of said first, second and third input/output means, and an address output connected to said memory input/output means;
  a control multiplexer having first second and third control inputs connected respectively to said control ports of said first, second and third input/output means, and a control output connected to said input/output means control port; and
  each of said data, address and control multiplexers receiving first and second select signals from said prioritizing means that indicate which of said first, second and third processors receives priority, said first and second select signals thereby controlling data, address and control signal transmission between said one processor and said memory.

16. An apparatus according to claim 15 wherein said prioritizing means further includes first and second slave select output lines for outputting from said apparatus said first and second select signals; and
 further including a multiplexer for configuring said prioritizing means to perform in one of a master mode and a slave mode, said multiplexer having first-and second select signal inputs connected to said prioritizing means for respectively inputting said first and second select signals from said prioritizing means, and also having first and second slave select signal inputs for receipt of external first and second select signals, said multiplexer controlled by a master/slave configuring signals that determines whether to input said first and second select signals from said prioritizing means and perform in said master mode or to input said first and second external select signals from said first and second slave select signal inputs and perform in said slave mode.

17. An apparatus according to claim 16 in which first and second priority input lines are connected to said prioritization means for receipt of first and second priority input signals, respectively, to alter said first grant prioritization, said second priority input signal, when input at a predetermined state, causing said prioritizing means to always provide said first grant access to said third processor when said first, second, and third chip select signals are input at substantially the same time.

18. An apparatus according to claim 17 wherein, said first priority input signal, when input at a predetermined state, causing said prioritizing means to always provide said first grant access to said second processor when said first and second chip select signals are input at substantially the same time.

19. An apparatus according to claim 1 wherein said prioritizing means further includes first and second slave select output lines for outputting from said apparatus said first and second ignals; and further including a multiplexer for configuring said prioritizing means to perform in one of a master mode and a slave mode, said multiplexer having first and second select signal inputs connected to said prioritizing means for respectively inputting said first and second select signals from said prioritizing means, and also having first and second slave select signal inputs for receipt of external first-and second select signals, said multiplexer controlled by a master/slave configuring signal that determines whether to input said first and second select signals from said prioritizing means and perform in said master mode or to input said first and second external select signals from said first and second slave select signal inputs and perform in said slave mode.

20. An apparatus according to claim 19 in which first and second priority input lines are connected to said prioritization means for receipt of first and second priority input signals, respectively, to alter said first grant prioritization and wherein said first priority input signal, when input at a predetermined state, causing said prioritizing means to always provide said first grant access to said second processor when said first and second chip select signals are input at substantially the same time.

21. An apparatus according to claim 20 wherein, said first priority input signal, when input at a predetermined state, causing said prioritizing means to always provide said first grant access to said second processor when said first and second chip select signals are input at substantially the same time.

22. An electronic communication system comprising:
a single port static random access memory having only one memory data port connected to memory data lines and only one memory control port connected to memory control lines;
first, second, and third asynchronously operating processors respectively connected to first, second and third data and control lines, for generating at least first, second and third chip select signals, address signals and control signals, respectively, that initiate memory operations for transmission of write data to said memory and read data from said memory, only one of said first, second and third processors capable of accessing said memory at a time and, when said one processor accesses said memory, said other processors simultaneously being capable of performing other operations; and
a configurable memory interface connected between each of said first, second and third processors and said memory, said configurable memory interface including:
memory input/output means, connected to said memory data lines and memory control lines, for transmitting said write data to and read data from said memory, respectively, and transmitting said address and control signals to said memory;
first input/output means, connected to said first data and control lines, for receiving said first chip select signal, said first address signals and said first write data from said first processor and transmitting said first read data to said first processor;
second input/output means, connected to said second data and control lines, for receiving said second chip select signal, said second address signals and said second write data from said second processor and transmitting said second read data to said second processor;
third input/output means, connected to said third data and control lines, for receiving said third chip select signal, said second address signals and said second write data from said third processor and transmitting said third read data to said third processor; and
means for determining which one of said first, second, and third processors will be granted access to said memory to perform said memory operation, said determining means comprising:
means for prioritizing said first, second, and third processors to give a first grant access of said memory to one of said first, second and third processors when said first, second and third chip select signals are input to said determining means at substantially the same time, said prioritizing means capable of being repeatedly altered to change said first grant prioritization when said substantially simultaneous first, second, and third chip select signals are input, and
means, responsive to said prioritizing means, for transmitting data associated with said one processor between said one processor and said memory during said memory operation prior to transmitting subsequent data between any processor other than said one processor and said memory.

23. An electronic communication system according to claim 22 wherein said prioritizing means comprises:
slave decision means for comparing said first and second chip select signals to obtain a slave chip select signal and a first select signal, and
master decision means for comparing said third chip select signal with said slave chip select signals to obtain a second select signal, said first and second select signals indicating which of said first, second and third processors receives priority.

24. An electronic communication system according to claim 22 wherein said memory input/output means, said first input/output means, said second input/output means, and said third input/output means each include a data port and a control port, said data port of said first, second and third input/output means including a data read input and a data write output; and wherein said determining means further comprises:
- a data read transmission line electrically connecting each of said first, second and third read data inputs to said input/output means data port;
- a data write multiplexer having first second and third write data inputs connected respectively to said data write output of said first, second and third input/output means, and a data write output connected to said input/output means data port;
- an address multiplexer having first second and third data inputs connected respectively to said address ports of said first, second and third input/output means, and an address output connected to said memory input/output means;
- a control multiplexer having first second and third control inputs connected respectively to said control ports of said first, second and third input/output means, and a control output connected to said input/output means control port; and
- each of said data, address and control multiplexers receiving first and second select signals from said prioritizing means indicating which of said first, second and third processors receives priority, said first and second select signals thereby controlling data, address and control signal transmission between said one processor and said memory.

25. An electronic communication system according to claim 24 wherein said prioritizing means further includes first and second slave select output lines for outputting from said apparatus said first and second signals; and further including a multiplexer for configuring said prioritizing means to perform in one of a master mode and a slave mode, said multiplexer having first and second select signal inputs connected to said prioritizing means for respectively inputting said first and second select signals from said prioritizing means, and also having first and second slave select signal inputs for receipt of external first and second select signals, said multiplexer controlled by a master/slave configuring signal that determines whether to input said first and second select signals from said prioritizing means and perform in said master mode or to input said first and second external select signals from said first and second slave select signal inputs and perform in said Slave mode.

26. An electronic communication system according to claim 25 in which first and second priority input lines are connected to said prioritization means for receipt of first and second priority input signals, respectively, to alter said first grant prioritization, said second priority input signal, when input at a predetermined state, causing said prioritizing means to always provide said first grant access to said third processor when said first, second, and third chip select signals are input at substantially the same time.

27. An electronic communication system according to claim 26 wherein, said first priority input signal, when input at a predetermined state, causing said prioritizing means to always provide said first grant access to said second processor when said first and second chip select signals are input at substantially the same time.

28. An electronic communication system according to claim 22 wherein said prioritizing means further includes first and second slave select output lines for outputting from said apparatus said first and second signals; and further including a multiplexer for configuring said prioritizing means to perform in one of a master mode and a slave mode, said multiplexer having first and second select signal inputs connected to said prioritizing means for respectively inputting said first and second select signals from said prioritizing means, and also having first and second slave select signal inputs for receipt of external first and second select signals, said multiplexer controlled by a master/slave configuring signal that determines whether to input said first and second select signals from said prioritizing means and perform in said master mode or to input said first and second external select signals from said first and second slave select signal inputs and perform in said slave mode.

29. An electronic communication system according to claim 22 in which first and second priority input lines are connected to said prioritization means for receipt of first and second priority input signals, respectively, to alter said first grant prioritization, said second priority input signal, when input at a predetermined state, causing said prioritizing means to always provide said first grant access to said third processor when said first, second, and third chip select signals are input at substantially the same time.

30. An electronic communication system according to claim 29 wherein, said first priority input signal, when input at a predetermined state, causing said prioritizing means to always provide said first grant access to said second processor when said first and second chip select signals are input at substantially the same time.

31. An electronic communication system according to claim 22 wherein each of said first, second and third processors are not of the same type.

* * * * *